(12) United States Patent
Bacelos (10) Patent No.: US 11,084,448 B2
(45) Date of Patent: Aug. 10, 2021

(54) ASSEMBLY FOR ATTACHING A TRIM ELEMENT

(71) Applicant: NOVARES France, Clamart (FR)

(72) Inventor: François Bacelos, Nice (FR)

(73) Assignee: NOVARES FRANCE, Clamart (FR)

( * ) Notice: Subject to any disclaimer, the term of this patent is extended or adjusted under 35 U.S.C. 154(b) by 71 days.

(21) Appl. No.: 16/462,119

(22) PCT Filed: Nov. 17, 2017

(86) PCT No.: PCT/FR2017/053148
§ 371 (c)(1),
(2) Date: May 17, 2019

(87) PCT Pub. No.: WO2018/091840
PCT Pub. Date: May 24, 2018

(65) Prior Publication Data
US 2019/0322237 A1    Oct. 24, 2019

(30) Foreign Application Priority Data
Nov. 18, 2016  (FR) ..................... 16/61246

(51) Int. Cl.
*B60R 21/216*  (2011.01)
*B60R 13/02*  (2006.01)
*B60R 21/213*  (2011.01)

(52) U.S. Cl.
CPC .......... *B60R 21/216* (2013.01); *B60R 13/025* (2013.01); *B60R 13/0206* (2013.01); *B60R 21/213* (2013.01)

(58) Field of Classification Search
CPC . B60R 21/216; B60R 13/0206; B60R 13/025; B60R 21/213
See application file for complete search history.

(56) References Cited

U.S. PATENT DOCUMENTS

| 6,431,585 B1 | 8/2002 | Rickabus |
| 7,717,458 B2 * | 5/2010 | Tsuge ..................... B60R 13/02 280/728.2 |

(Continued)

FOREIGN PATENT DOCUMENTS

| DE | 19910594 A1 | 9/2000 |
| EP | 1769979 B1 | 4/2008 |

(Continued)

OTHER PUBLICATIONS

English Machine Translation for Abstract DE19910594.
(Continued)

*Primary Examiner* — Faye M Fleming
(74) *Attorney, Agent, or Firm* — Cantor Colburn LLP (57) ABSTRACT

An assembly for attaching a trim element (2) to a structural element (3) of a vehicle, between which a safety airbag (27) is inserted that is able to take a folded stand-by position, a deployed protection position and a deflated post-deployment position, the attachment assembly comprising primary attachment means that allows the trim element (2) to be held against the structural element (3) when the airbag (27) is in stand-by position, and secondary attachment means allowing the trim element (2) to be held when the airbag (27) is in protection position comprises, in addition, means for bringing the trim element (2) back toward the structural element (3) when the airbag (27) is in post-deployment position.

20 Claims, 6 Drawing Sheets

(56) References Cited

U.S. PATENT DOCUMENTS

| | | | |
|---|---|---|---|
| 9,487,162 B2* | 11/2016 | Inagawa | B60R 13/0206 |
| 9,751,489 B2* | 9/2017 | Yamamoto | B60R 21/213 |
| 9,776,578 B2* | 10/2017 | Yamamoto | B60R 21/213 |
| 2007/0176399 A1* | 8/2007 | Kullack | B60R 21/215 |
| | | | 280/728.3 |
| 2020/0198552 A1* | 6/2020 | Naoi | B62D 25/04 |

FOREIGN PATENT DOCUMENTS

| | | | |
|---|---|---|---|
| EP | 2514639 A2 | 10/2012 | |
| JP | 2004161141 A * | 6/2004 | B60R 21/216 |

OTHER PUBLICATIONS

English Machine Translation for Abstract EP2514639.
International Search Report for Application No. PCT/FR2017/053148.
Written Opinion for Application No. PCT/FR2017/053148.

* cited by examiner

ASSEMBLY FOR ATTACHING A TRIM ELEMENT

CROSS REFERENCE TO RELATED APPLICATIONS

This application is a National Stage of PCT Application No. PCT/FR2017/053148 filed on Nov. 17, 2017, which claims priority to French Patent Application No. 16/61246 filed on Nov. 18, 2016, the contents each of which are incorporated herein by reference thereto.

BACKGROUND

The invention concerns an assembly for fastening a trim element to a structural element of a vehicle during a deployment of an airbag interposed between the trim elements and the body.

The invention also concerns a vehicle equipped with this set. Airbags are used in particular in the automotive field to protect the passengers of a vehicle during an impact.

An airbag is a flexible cushion made of a fabric in which a gas is injected by an explosive chemical reaction, to ensure the protection of a passenger of a vehicle.

Airbags are disposed in the interior of the vehicle, in the steering wheel, in the dashboard, in the roof pillars . . . . To the extent that the airbags are technical safety devices, they are hidden by trim elements generally made of a plastic material.

When detecting an accident by the vehicle, the trim element, which may include score lines, is brought away by the airbag to enable the deployment of the airbag.

The trim element is retained to the structure of the vehicle in order to avoid injuring a passenger. For example, there is known, in the document EP 2 514 639, an assembly for retaining a trim element during an airbag deployment.

In the case of a curtain-type side airbag, the airbag is interposed between a structural element of the vehicle forming a body side and a trim element of the vehicle mounted on this structural element.

When detecting a collision, the airbag inflates by injection of gas thereinside. In some cases, the airbag is deployed and strongly loads the trim element which will be deformed and may be detached from the structural element in the vehicle interior. In order to prevent the trim element or fragments thereof from constituting a projectile likely to injure one of the passengers of the vehicle, it is necessary to retain the trim element to the vehicle structural element while enabling the deployment of the airbag.

Yet, in the general approach aiming at enhancing the safety of the passengers of a vehicle, there is a tendency to enlarge the volume of the airbags which may range up to 150/200 liters.

The increase of the capacity of the airbags subjects the trim elements that hide the airbags to very high loads.

BRIEF SUMMARY

In this technical context, an object of the invention is to improve the retention of a trim element during the deployment of an airbag and in particular a large-volume airbag which produces a large deployment stroke.

The invention concerns an assembly for fastening a trim element to a structural element of a vehicle between which is interposed an airbag able to present a standby folded position, a protection deployed position and a post-deployment deflated position, the fastening assembly comprising primary fastening means allowing retaining the trim element against the structural element, the airbag being in the standby position and secondary fastening means allowing retaining the trim element when the airbag is in the protection position characterized in that the set further comprises means for bringing the trim element back towards the structural element when the airbag is in the post-deployment position.

Thus, the invention allows controlling and optimizing the displacement of the trim element according to the deployment of the airbag and minimizing the loads caused by the deployment of the airbag on the trim element. This fastening assembly may be used regardless of the volume and the explosion power of the airbag (universal fastening). In addition, the invention improves the deformational behavior of the trim element during the deployment of the airbag and in particular of a large-volume airbag which produces a considerable displacement stroke of the trim element and presses the trim element back against the structural element of the vehicle after the deployment of the airbag.

In an embodiment of the invention, the primary fastening means comprise (i) a clip-holder secured to the trim element having a clipping opening and (ii) a retaining member comprising a clipped retaining head, on the one hand, the clipping opening of the clip-holder and clipped, on the other hand, into an opening formed in the structural element, and in that the secondary fastening means comprise a bead connecting the trim element to the retaining head after the unclipping of the retaining head from the opening of the clip-holder during the deployment of the airbag, the bead being constituted by an elastic material allowing bringing the trim element back towards the structural element when the airbag is in the post-deployment position.

It may be considered that the retaining head comprises a base in which an end of the bead is fastened, the base having clipping ribs for retaining the trim element and a clip intended to engage into the opening of the structural element.

In one variant, the retaining head is a monolithic set comprising the base and the clip.

In another variant, the retaining head comprises a base provided with a receiving groove in which a clip can be slid.

In another variant, the retaining head comprises a circlip secured to the bead on which the clip is engaged, the set being inserted into the clip-holder.

Preferably, the secondary fastening means comprise an anchor placed at the end of the bead displaceable between a standby position and a retaining position in which the anchor bears against the clip-holder.

Preferably, the bead comprises an elastomeric material having a coefficient of elongation of 100 to 300%.

BRIEF DESCRIPTION OF THE DRAWINGS

The invention will be better understood on reading the following description, provided only as a non-limiting example and made with reference to the drawings in which.

DETAILED DESCRIPTION

For simplicity, the elements that are common to the different variants of the invention bear common numerals.

Figure 1:
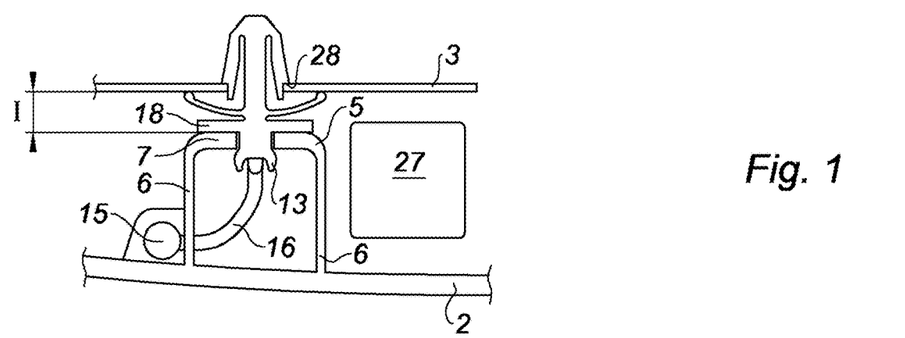
FIGS. 1 to 3 show a fastening assembly retaining a trim element on a vehicle structural element according to different phases of use of an airbag.
Figure 2:
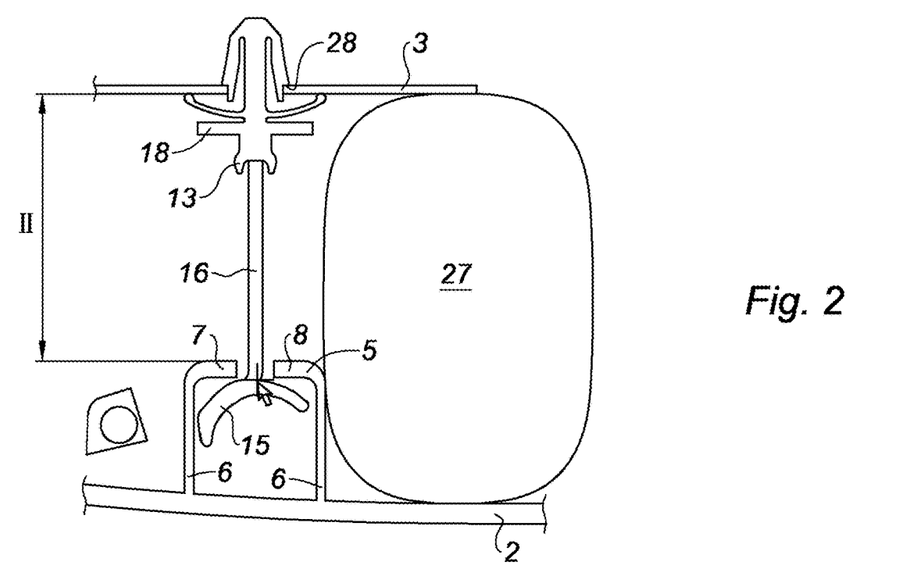
Figure 3:
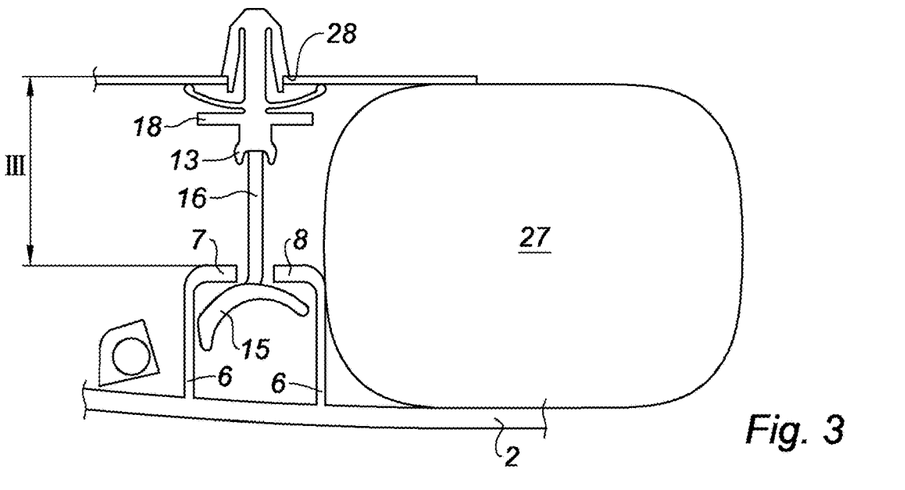

As shown in FIGS. 1 to 3, the fastening assembly 1 is designed to ensure fastening of a trim element 2, generally made of a plastic material, on a structural element 3 of a vehicle, generally metallic.

In the examples shown in FIGS. 1 to 5, the trim element 2 is provided with a clip-holder 5 which is integrally molded with the trim element 2.

The clip-holder 5 is in the form of a bridge having two lateral columns 6 connected by a spacer 7 in which an opening 8 is formed.

Figure 6:
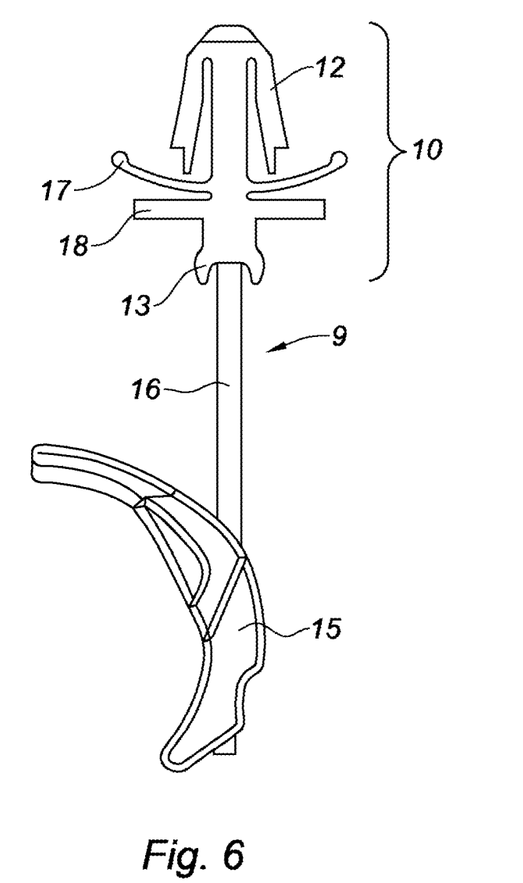
FIG. 6 shows an embodiment of a retaining member.
Figure 8:
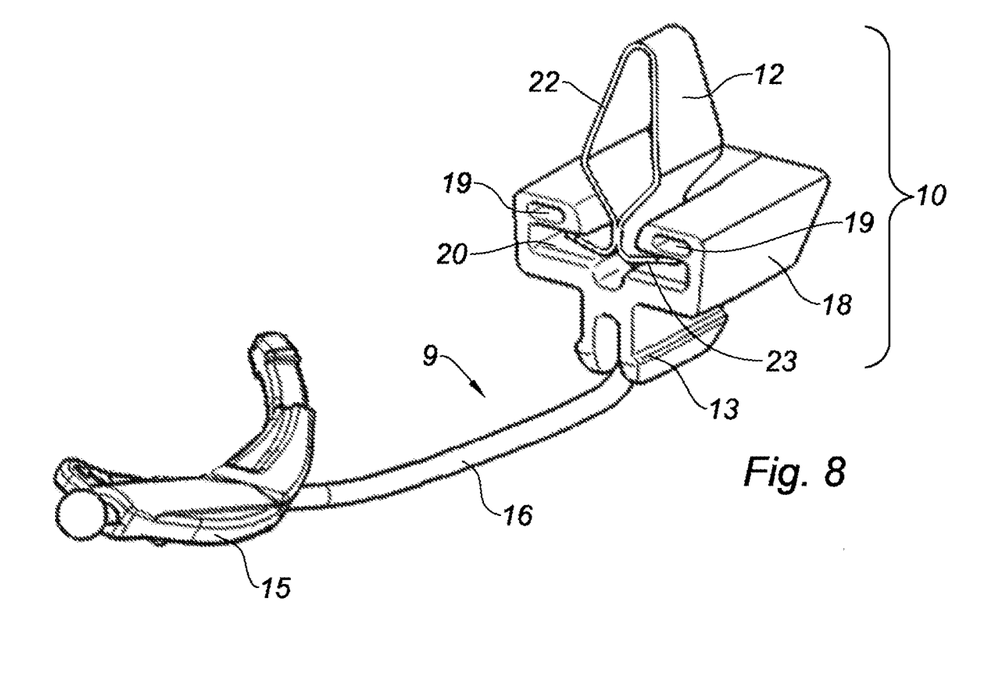
Figure 9:
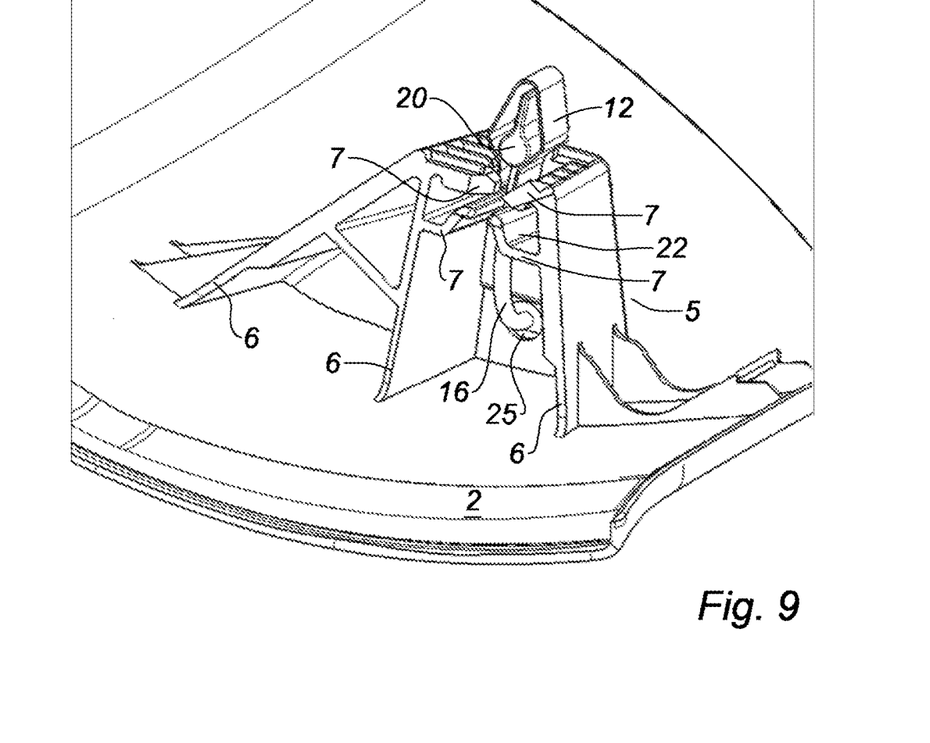
FIGS. 9 to 11 show several examples of clips adapted to be used with the retaining member of FIGS. 7 and 8.

The clip-holder 5 is intended to receive a retaining member 9 that is shown more particularly in FIGS. 6 and 8 in two possible embodiments.

The retaining member 9 has three portions, namely a retaining head 10 provided with a clip 12 and clipping ribs 13, an anchor 15 and a bead 16 which connects the retaining head 10 to the anchor 15.

As will appear later on, the retaining head 10 is designed to ensure fastening, on the one hand, with the clip-holder 5 and, on the other hand, with a structural element 3.

FIG. 6 shows an embodiment of the retaining head 10 in which the clip 12 and the clipping ribs 13 form a monolithic set from a base 18.

As also shown in this embodiment, the clip 12 is provided with bearing blades 17 which allow compensating the manufacturing tolerances and avoid parasitic noises.

FIGS. 7 to 12 show two variants of the invention in which the clip 12 is separated from its base.

Figure 7:
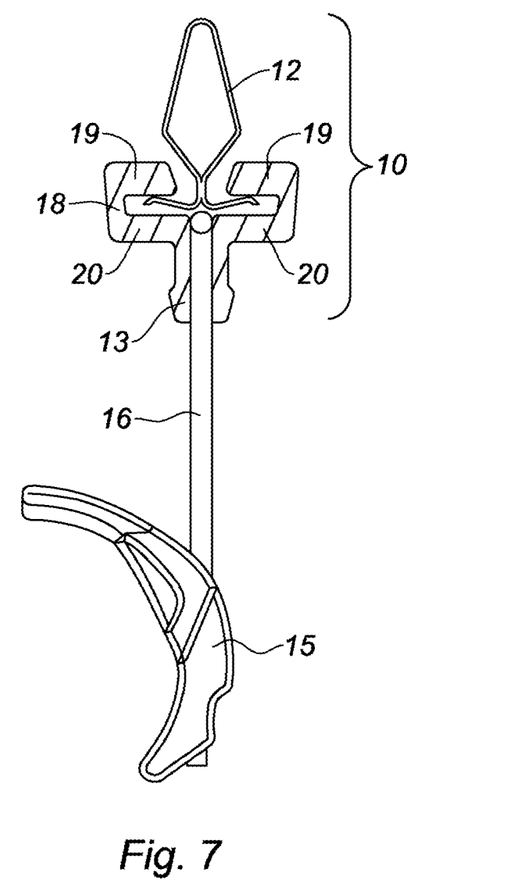
FIGS. 7 and 8 show another embodiment of a retaining member using a standard clip.

FIGS. 7 to 8 show a first variant in which the retaining head 10 is dissociated into two distinct portions, namely: a base 18 and a clip 12 separated from the base 18. As shown in FIG. 7, the base is a part made of a plastic material preferably molded together with the bead 16. The base 18 comprises two fold-backs 19 which face each other and which delimit two slots 20.

Figure 13:
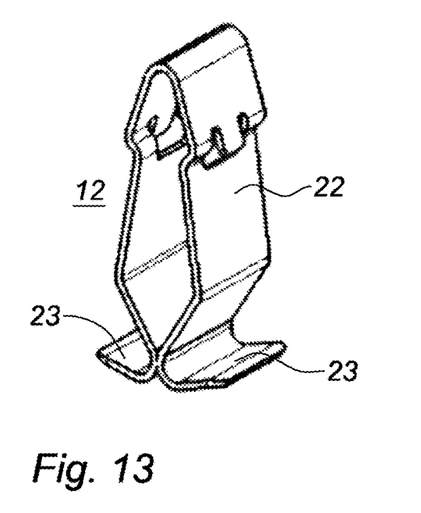
FIGS. 13 to 15 show other embodiments of a clip.
Figure 14:
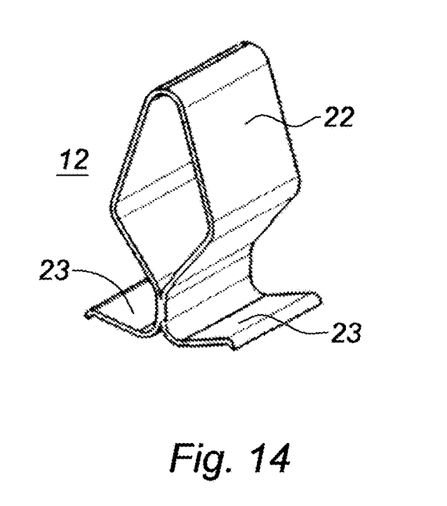
Figure 15:
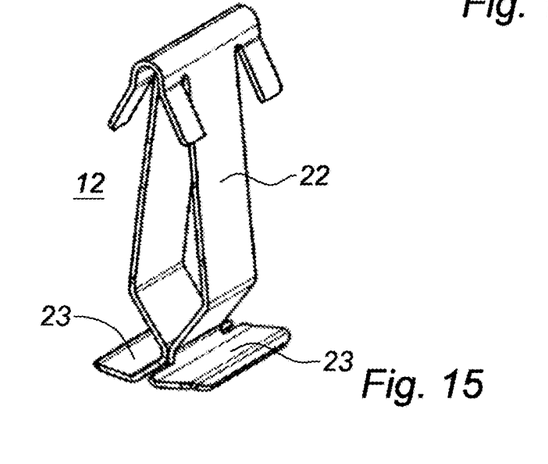

In this variant, the clip 12 may consist of a metallic element made of spring steel which has a lozenge-shaped clipping portion 22 and a foot comprising two blades 23 which are engaged into the slots 20 of the base 18. The clip 12 may have, as the case may be, shape variants as shown in FIGS. 13, 14 and 15. Thus, this variant allows embedding metallic clips 12 which, moreover, may be of a standard type.

The anchor 15 may have an arcuate shape or said otherwise a «crescent moon»-like shape. The anchor 15 is mechanically connected to the bead 16, for example by overmolding.

Figure 10:
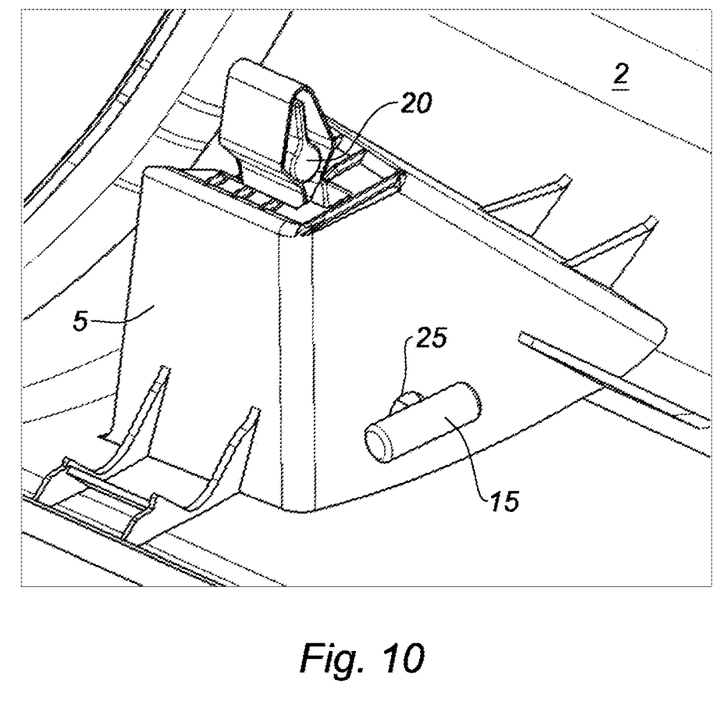
Figure 11:
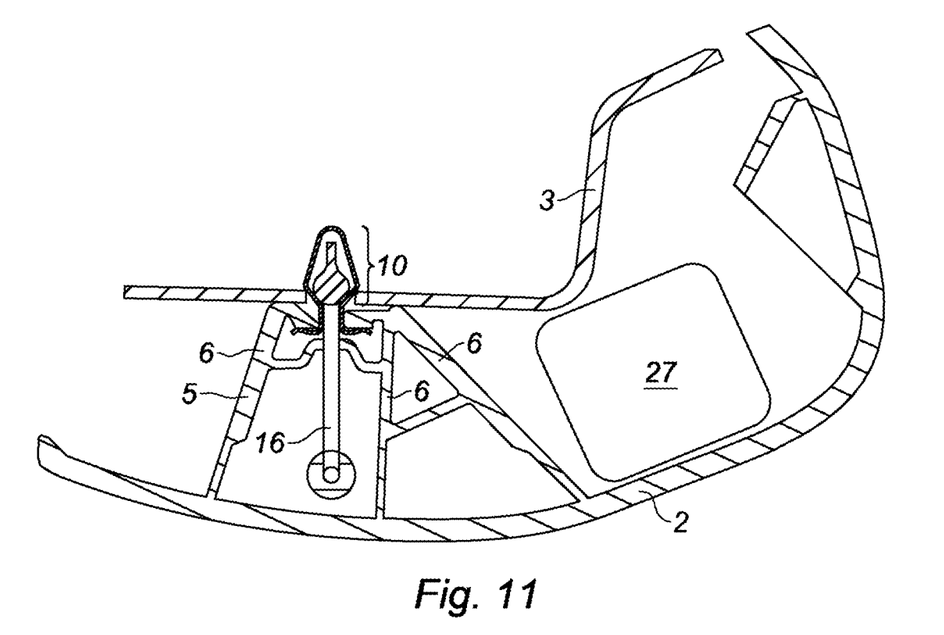
Figure 12:
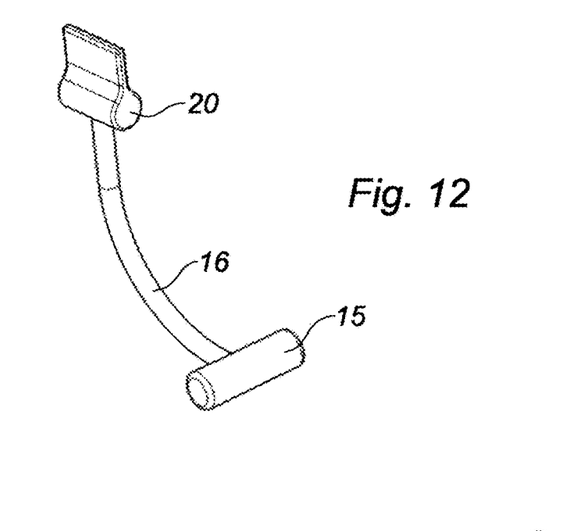
FIG. 12 shows another embodiment of a retaining member.

FIGS. 10 to 11 show a second variant in which a clip 12 is directly fastened on the bead 16. In this variant, an anchor 15 in the form of a bar and a substantially pyriform circlip 20 are overmolded on the bead 16 so as to form the retaining member 9. The clip 12 which may be a metallic clip of the type like those represented in FIGS. 13 to 15 is slid on the circlip 20. The elasticity properties of the clip 12 are used to ensure the blockage of the clip on the circlip.

In this variant of the invention, the clip-holder 5 may have two superimposed spacers 7 which delimit a chamber 22 into which the blades 23 that form the foot of the clip 12 are slid as shown in FIG. 11.

Depending on the configuration of the trim element 2, the clip-holder 5 may comprise three columns 6.

The bead 16 which connects the anchor 15 to the retaining head 10 is made of an elastic material based in particular on an elastane-type elastomer. It consists of a highly elastic material which may have a coefficient of elongation in the range of 100 to 300%.

Figure 4:
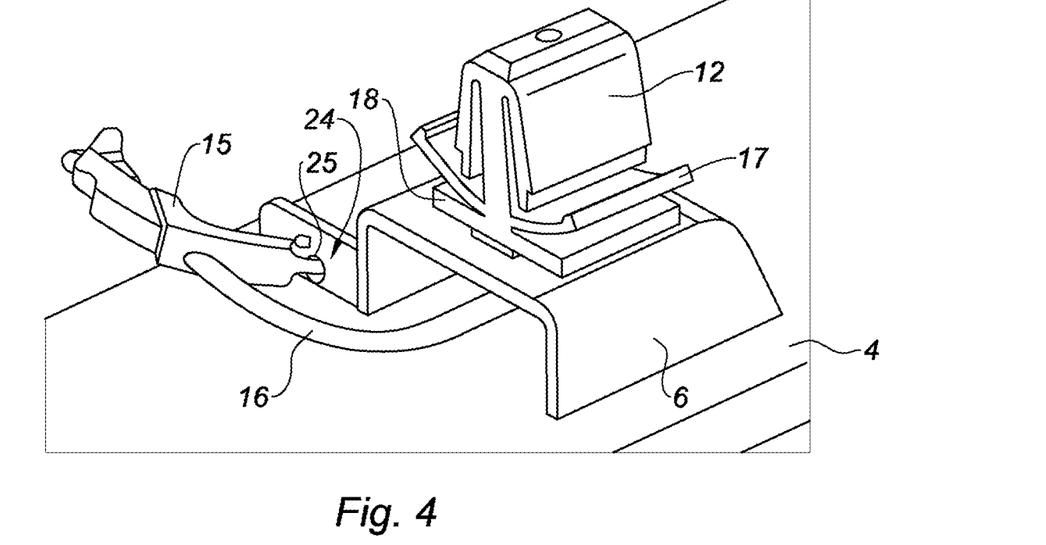
FIGS. 4 and 5 show in perspective view two variants of the invention.
Figure 5:
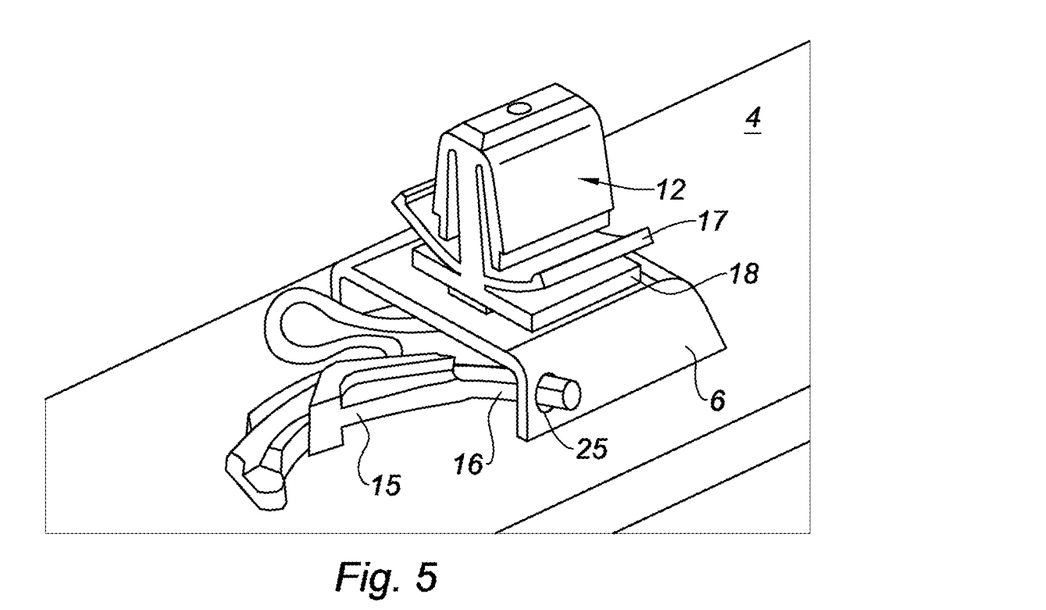

FIGS. 4 and 5 represent two variants of a trim element 2 waiting for installation on a vehicle.

In a first embodiment, the clip-holder 5 ensures the blockage of the anchor 15 by an opening 25 made in a wall 24 which is perpendicular to a column of the clip-holder 5 as shown in FIG. 1. In a second embodiment, an opening 25 is provided directly in the column of the clip-holder into which the anchor 15 is engaged.

The trim element 2 thus designed is clipped into an opening 28 formed in a structural element 3 during the assembly of the vehicle.

Thus, FIG. 1 shows the trim element 2 clipped into the opening of the structural element 3.

As shown in this figure, the retaining member 10 achieves a primary fastening of the trim element 2 on the structural element 3 thanks to the clip 12 which ensures the retention on the structural element 3 and thanks to the clipping ribs 13 which ensure the retention on the clip-holder 5.

An airbag 27 schematically represented in FIG. 1 in its folded configuration is interposed between the structural element 3 and the trim element 2.

When the vehicle detects a dangerous situation for a passenger, a deployment command is sent to the airbag 27 which triggers the deployment of the airbag 27.

FIG. 2 shows the deployment phase of the airbag 27 during which the airbag 27 exerts a thrust on the trim element 2. The thrust on the trim element 2 causes an unclipping of the clip-holder 5 which releases the trim element 2. The retaining head 10 remains fastened to the structural element 3 but releases the trim element 2; by the effect of the thrust of the airbag, the clipping ribs fade away and release the clip-holder 5.

In this variant, the trim element 2 is then connected to the vehicle by the bead 16. The anchor 15 unclips from the opening 25 in which it has already been housed and is brought to bear against the spacer 7 of the bridge, bearing in mind that the anchor 15 has a dimension which does not enable it to pass throughout the opening 8 of the clip-holder 5.

In another variant, the anchor 15 does not unclip from the opening 25.

FIG. 3 shows the post-deployment configuration.

The bead 16 which is made of an elastic material extends and accompanies the deployment of the airbag 27 as shown in FIG. 4 and might injure a passenger of the vehicle.

In the post-deployment configuration during which the airbag 27 is deflated by vents or by the porosity of the fabric forming the airbag, the bead 16 which has been elastically loaded contracts and brings the trim element 2 back in the direction of the structural element 3 thereby avoiding having the trim element 2 hanging off the tip of the bead 16.

FIGS. 1 to 3 respectively show:

The primary retention of the trim element 2 on the body element 3 according to a nominal dimension I;

The secondary retention of the trim element 2 on the structural element 3 during the deployment of the airbag 27 according to a maximum dimension II;

The secondary retention of the trim element 2 on the body element 3 in a deflation phase of the airbag 27 during which the elastic bead 16 brings the trim element 2 back in the direction of the structural element 3 according to a final dimension III which may be in the range of 50% of the maximum dimension II.

Thus, the invention provides an assembly for fastening a trim element 2 covering a large-capacity airbag. Thanks to the presence of an elastic bead 16, the fastening assembly may ensure the retention of a trim element 2 during the deployment of a large-capacity airbag by accompanying the deployment of the airbag and can ensure that the trim element 2 presses on the airbag during the deflation of the airbag.

The invention claimed is:

1. An assembly for fastening a trim element to a structural element of a vehicle between which is interposed an airbag able to present a standby folded position, a protection deployed position and a post-deployment deflated position, the fastening assembly comprising primary fastening means retaining the trim element to the structural element, when the airbag is in the standby folded position and secondary fastening means retaining the trim element when the airbag is in the protection deployed position and wherein the assembly further comprises means for bringing the trim element back towards the structural element when the airbag is in the post-deployment deflated position.

2. The fastening assembly according to claim 1, wherein the primary fastening means comprise (i) a clip-holder secured to the trim element having a clipping opening and (ii) a retaining member comprising a retaining head clipped into the clipping opening of the clip-holder and clipped into an opening formed in the structural element,
    and wherein the secondary fastening means comprise a bead connecting the trim element to the retaining head after unclipping of the retaining head from the opening of the clip-holder during deployment of the airbag, the bead being an elastic material that brings the trim element back towards the structural element when the airbag is in the post-deployment deflated position.

3. The fastening assembly according to claim 2, wherein the retaining head comprises a base in which an end of the bead is fastened, the base having clipping ribs for retaining the trim element and a clip intended to engage into the opening of the structural element.

4. The fastening assembly according to claim 2, wherein the retaining head comprises a base in which an end of the bead is fastened, the base retaining the trim element, and a clip intended to engage into the opening of the structural element wherein the retaining head is a monolithic set comprising the base and the clip.

5. The fastening assembly according to claim 3, wherein the base is provided with a receiving groove in which the clip can be slid.

6. The fastening assembly according to claim 2, wherein the retaining head comprises a circlip secured to the bead on which a clip intended to engage into the opening of the structural element is engaged, the circlip and the clip being inserted into the clip-holder.

7. The fastening assembly according to claim 2, wherein the secondary fastening means comprise an anchor placed at an end of the bead displaceable between a standby position and a retaining position in which the anchor bears against the clip-holder.

8. The fastening assembly according to claim 2, wherein the bead comprises an elastomeric material having a coefficient of elongation of 100 to 300%.

9. The fastening assembly according to claim 3, wherein the retaining head is a monolithic set comprising the base and the clip.

10. The fastening assembly according to claim 3, wherein the retaining head comprises a circlip secured to the bead on which the clip is engaged, the circlip and the clip being inserted into the clip-holder.

11. The fastening assembly according to claim 4, wherein the retaining head comprises a circlip secured to the bead on which the clip is engaged, the circlip and the clip being inserted into the clip-holder.

12. The fastening assembly according to claim 5, wherein the retaining head comprises a circlip secured to the bead on which the clip is engaged, the circlip and the clip being inserted into the clip-holder.

13. The fastening assembly according to claim 9, wherein the retaining head comprises a circlip secured to the bead on which the clip is engaged, the circlip and the clip being inserted into the clip-holder.

14. The fastening assembly according to claim 13, wherein the secondary fastening means comprise an anchor placed at an end of the bead displaceable between a standby position and a retaining position in which the anchor bears against the clip-holder.

15. The fastening assembly according to claim 14, wherein the bead comprises an elastomeric material having a coefficient of elongation of 100 to 300%.

16. The fastening assembly according to claim 2, wherein the secondary fastening means comprise an anchor placed at an end of the bead displaceable between a standby position and a retaining position in which the anchor bears against the clip-holder.

17. The fastening assembly according to claim 3, wherein the secondary fastening means comprise an anchor placed at an end of the bead displaceable between a standby position and a retaining position in which the anchor bears against the clip-holder.

18. The fastening assembly according to claim 4, wherein the secondary fastening means comprise an anchor placed at an end of the bead displaceable between a standby position and a retaining position in which the anchor bears against the clip-holder.

19. The fastening assembly according to claim 16, wherein the bead comprises an elastomeric material having a coefficient of elongation of 100 to 300%.

20. The fastening assembly according to claim 17, wherein the bead comprises an elastomeric material having a coefficient of elongation of 100 to 300%.

* * * * *